US012066159B2

(12) United States Patent
Sugihara et al.

(10) Patent No.: US 12,066,159 B2
(45) **Date of Patent: *Aug. 20, 2024**

(54) VEHICLE LAMP

(71) Applicant: Stanley Electric Co., Ltd., Tokyo (JP)

(72) Inventors: Yuki Sugihara, Tokyo (JP); Shinya Hoshino, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/252,832

(22) PCT Filed: Nov. 12, 2021

(86) PCT No.: PCT/JP2021/041757
§ 371 (c)(1),
(2) Date: May 12, 2023

(87) PCT Pub. No.: WO2022/113785
PCT Pub. Date: Jun. 2, 2022

(65) Prior Publication Data
US 2024/0003510 A1 Jan. 4, 2024

(30) Foreign Application Priority Data
Nov. 24, 2020 (JP) ................................ 2020-194027

(51) Int. Cl.
*F21V 5/00* (2018.01)
*F21S 41/143* (2018.01)
(Continued)

(52) U.S. Cl.
CPC ........... *F21S 41/265* (2018.01); *F21S 41/143* (2018.01); *F21S 41/151* (2018.01); *F21S 45/47* (2018.01); *F21V 5/008* (2013.01)

(58) Field of Classification Search
CPC .......... F21S 41/265; F21S 41/24; F21S 41/27; F21S 41/143; F21S 41/28; F21S 41/32; F21S 41/151; F21S 45/47; F21V 5/008
See application file for complete search history.

(56) References Cited

U.S. PATENT DOCUMENTS 5,685,627 A 11/1997 Kato
11,536,432 B2 * 12/2022 Sugihara .............. F21S 41/275
(Continued)

FOREIGN PATENT DOCUMENTS

AT 504668 B1 * 7/2008 ............ F21S 41/143
CN 109630976 A 4/2019
(Continued)

OTHER PUBLICATIONS

Search English translation of AT-504668-B1 (Year: 2017).*
(Continued)

*Primary Examiner* — Omar Rojas Cadima
(74) *Attorney, Agent, or Firm* — KENEALY VAIDYA LLP

(57) ABSTRACT

A projection lens has first-lens-body including first incidence part located in an area facing first light source and emission part located on a side opposite to the first incidence part, and second-lens-body including second incidence part located in an area facing second light source and third incidence part located between the first incidence part and the second incidence part, and has structure in which the first-lens-body and the second-lens-body abut against each other while first boundary surfaces and second boundary surfaces are interposed between the first-lens-body and the second-lens-body, the first boundary surfaces being provided between the emission part and the third incidence part, and the second boundary surfaces extending from boundary-line with respect to the first boundary surface until the first incidence part and the third incidence part, and the first
(Continued)

1A boundary surfaces and the second boundary surfaces are disposed at acute angle while having the boundary-line disposed therebetween.

8 Claims, 11 Drawing Sheets

(51) Int. Cl.

| | |
|---|---|
| ***F21S 41/151*** | (2018.01) |
| ***F21S 41/265*** | (2018.01) |
| ***F21S 45/47*** | (2018.01) |

(56) References Cited

U.S. PATENT DOCUMENTS

| | | | | |
|---|---|---|---|---|
| 2016/0369966 | A1 | 12/2016 | Kuwata et al. | |
| 2017/0198877 | A1* | 7/2017 | Suwa | B62J 6/022 |
| 2017/0292671 | A1* | 10/2017 | Gousset-Rousseau | F21S 41/153 |
| 2019/0226658 | A1 | 7/2019 | Kawai et al. | |
| 2020/0041089 | A1 | 2/2020 | Gromfeld | |

FOREIGN PATENT DOCUMENTS

| | | | |
|---|---|---|---|
| DE | 10 2007 052 696 | A1 | 7/2008 |
| EP | 3 232 118 | A1 | 10/2017 |
| JP | H08-167301 | A | 6/1996 |
| KR | 10-2020-0079863 | A | 7/2020 |
| WO | 2018/043663 | A1 | 3/2018 |

OTHER PUBLICATIONS

International Search Report for PCT/JP2021/041757dated Dec. 7, 2021.
Extended European Search Report for the related European Patent Application No. 21185310.6 dated Dec. 15, 2021.
Office Action issued Mar. 16, 2022 in U.S. Appl. No. 17/372,232.

* cited by examiner

1A

1B

1B

1C

VEHICLE LAMP

This application is a U.S. National Stage Application under 35 U.S.C § 371 of International Patent Application No. PCT/JP2021/041757 filed Nov. 12, 2021, which claims the benefit of priority under 35 U.S.C. § 119 to Japanese Patent Application No. 2020-194027 filed Nov. 24, 2020, the disclosures of all of which are hereby incorporated by reference in their entireties.

TECHNICAL FIELD

The present invention relates to a vehicle lamp.

Priority is claimed on Japanese Patent Application No. 2020-194027, filed Nov. 24, 2020, the content of which is incorporated herein by reference.

BACKGROUND ART

For example, a vehicle lamp such as a headlight (headlamp) for a vehicle or the like includes a light source, a reflector configured to reflect light emitted from the light source in a direction of advance of the vehicle, a shade configured to shield (cut) some of the light reflected by the reflector, and a projection lens configured to project the light, some of which is cut by the shade in the direction of advance of the vehicle.

In such a vehicle lamp, a light distribution pattern for a low beam including a cutoff line on an upper end is formed by reversing and projecting a light source image defined by a front end of the shade using a projection lens as a passing beam (low beam).

In addition, in the vehicle lamp, a light distribution pattern for a high beam is formed above the light distribution pattern for a low beam by disposing a separate light source, which is configured to emit light in the direction of advance of the vehicle, below the shade and projecting the light emitted from the light source using a projection lens as a traveling beam (high beam).

Incidentally, in a vehicle lamp disclosed in the following Patent Document 1, it is proposed to form a light distribution pattern for a low beam and a light distribution pattern for a high beam using two light guide members provided to correspond to two light sources of above and below, instead of the above-mentioned reflector and shade.

CITATION LIST

[Patent Document]

[Patent Document 1]

PCT International Publication No. WO2018/043663

SUMMARY OF INVENTION

Technical Problem

However, in the vehicle lamp disclosed in the above-mentioned Patent Document 1, a passing beam is formed by providing an air layer (air gap) between the two light guide members and totally reflecting the light from the first light guide lens using a total reflection surface portion. For this reason, although the light distribution area for a high beam is not irradiated with this configuration, it is difficult to form a light distribution pattern for overhead in the light distribution area for a high beam, which is required for a passing beam.

An aspect of the present invention is directed to providing a vehicle lamp capable of forming a light distribution pattern for overhead while obtaining a good light distribution pattern.

Solution to Problem

In order to achieve the aforementioned objects, the present invention provides the following configurations.

(1) A vehicle lamp including:

a first light source configured to emit first light;

a second light source that is disposed adjacent to the first light source and that is configured to emit second light in a same direction as the first light; and a projection lens configured to project the first light and the second light in the same direction, wherein the projection lens has a first lens body including a first incidence part located in an area facing the first light source and an emission part located on a side opposite to the first incidence part, and a second lens body including a second incidence part located in an area facing the second light source and a third incidence part between the first incidence part and the second incidence part, and a structure in which the first lens body and the second lens body abut against each other in a state in which first boundary surfaces and second boundary surfaces are interposed between the first lens body and the second lens body, the first boundary surfaces being provided between the first lens body and the second lens body at between the emission part and the third incidence part, and second boundary surfaces being provided between the first lens body and the second lens body and extending from a boundary line with respect to the first boundary surface until the first incidence part and the third incidence part, the first boundary surface and the second boundary surface are disposed at an acute angle while having the boundary line disposed therebetween, among the first light entering an inside of the first lens body from the first incidence part, first light reflected at the second boundary surface is emitted to outside of the first lens body from the emission part, among the second light entering an inside of the second lens body from the second incidence part, second light passing through the first boundary surface and second light passing through the second boundary surface are emitted to the outside of the first lens body from the emission part, and among the first light entering the inside of the second lens body from the third incidence part, first light passing through the first boundary surface is emitted to the outside of the first lens body from the emission part.

(2) The vehicle lamp according to the above-mentioned (1), wherein a refractive index of the second lens body is smaller than a refractive index of the first lens body.

(3) The vehicle lamp according to the above-mentioned (2), wherein a structure in which the first lens body and the second lens body abut each other via an intermediate layer is provided, and the refractive index of the second lens body is equal to or smaller than a refractive index of the intermediate layer.

(4) The vehicle lamp according to any one of the above-mentioned (1) to (3), wherein the emission part has a lens surface configured to condense the first light and the second light in a direction in which the boundary line extends and a direction in which the first light source and the second light source are arranged.

(5) The vehicle lamp according to any one of the above-mentioned (1) to (3), wherein the projection lens has a third lens body located on a side facing the emission part, the emission part has a lens surface configured to condense the first light and the second light in a direction in which the boundary line extends, and the third lens body has a lens surface configured to condense the first light and the second light emitted from the emission part in a direction in which the first light source and the second light source are arranged.

(6) The vehicle lamp according to the above-mentioned (5), wherein the third lens body is integrally assembled to the first lens body in a state in which an air layer is provided between the third lens body and the emission part.

(7) The vehicle lamp according to any one of the above-mentioned (1) to (6), wherein the first light source and the second light source are provided on a same surface of a same board.

(8) The vehicle lamp according to any one of the above-mentioned (1) to (7), wherein the first light entering from the first incidence part and projected by the projection lens forms a first light distribution pattern including a cutoff line defined by the boundary line on an upper end thereof, the second light entering from the second incidence part and projected by the projection lens forms a second light distribution pattern located above the first light distribution pattern, and the first light entering from the third incidence part and projected by the projection lens forms a third light distribution pattern located above the cutoff line.

Advantageous Effects of Invention

According to the aspects of the present invention, it is possible to provide a vehicle lamp capable of forming a light distribution pattern for overhead while obtaining a good light distribution pattern.

DESCRIPTION OF EMBODIMENTS

Figure 1:
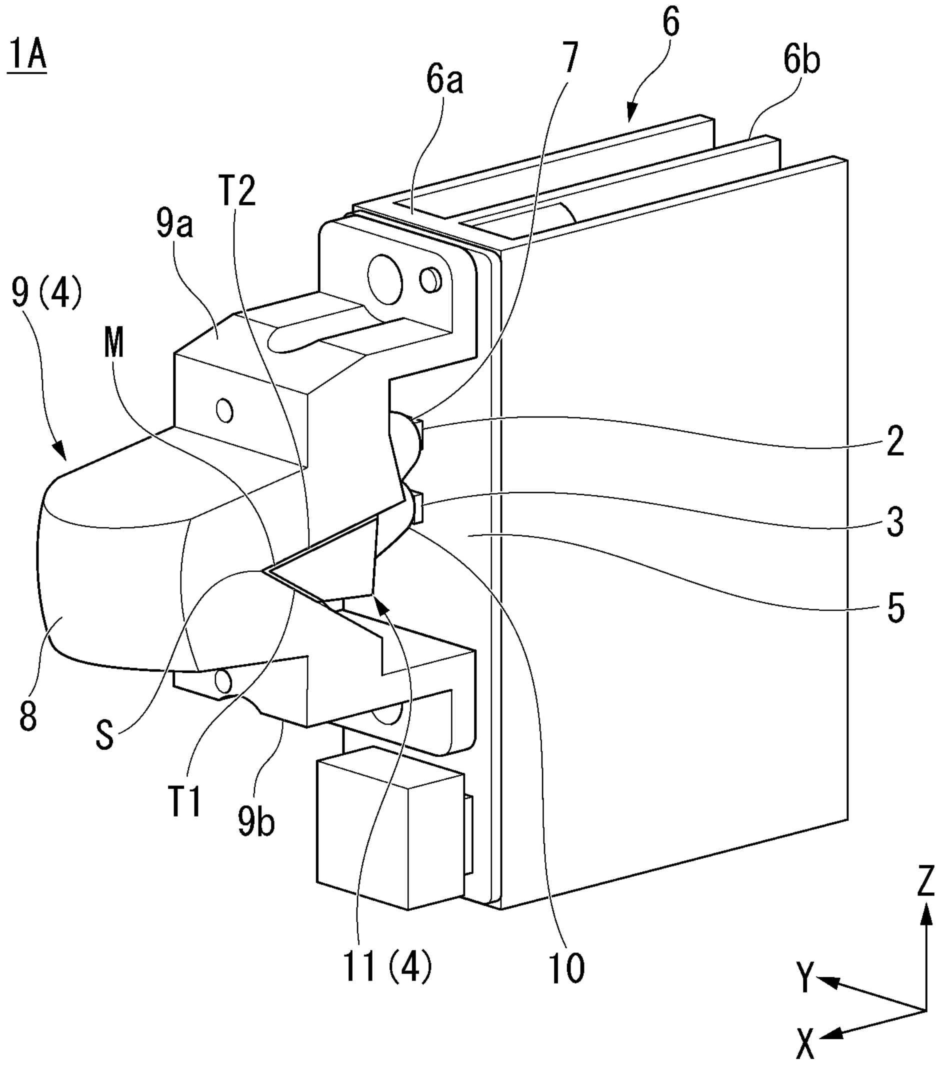
FIG. 1 is a perspective view showing a configuration of a vehicle lamp according to a first embodiment of the present invention.

Hereinafter, embodiments of the present invention will be described in detail with reference to the accompanying drawings.

Further, in the drawings used in the following description, in order to make components easier to see, dimensional scales may vary depending on the components, and the dimensional ratios of each component may not always be the same as the actual ones.

In addition, in the drawings as described below, an XYZ orthogonal coordinate system is set, an X-axis direction indicates a forward/rearward direction (lengthwise direction) of a vehicle lamp, a Y-axis direction indicates a leftward/rightward direction (widthwise direction) of the vehicle lamp, and a Z-axis direction indicates an upward/downward direction (height direction) of the vehicle lamp.

First Embodiment

First, as a first embodiment of the present invention, for example, a vehicle lamp 1A shown in FIG. 1 to FIG. 6 will be described.

Figure 2:
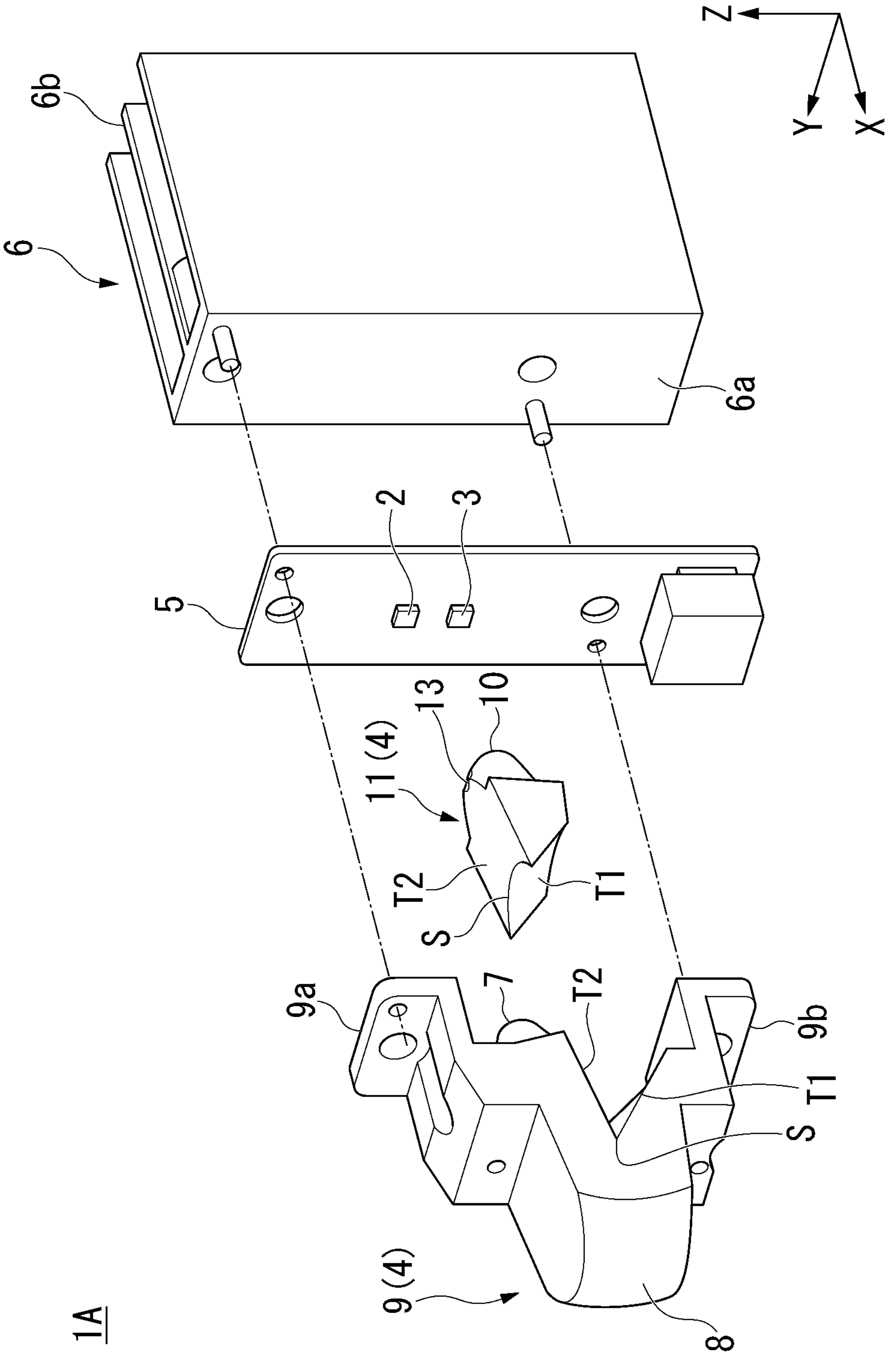
FIG. 2 is an exploded perspective view showing a configuration of the vehicle lamp shown in FIG. 1.
Figure 3:
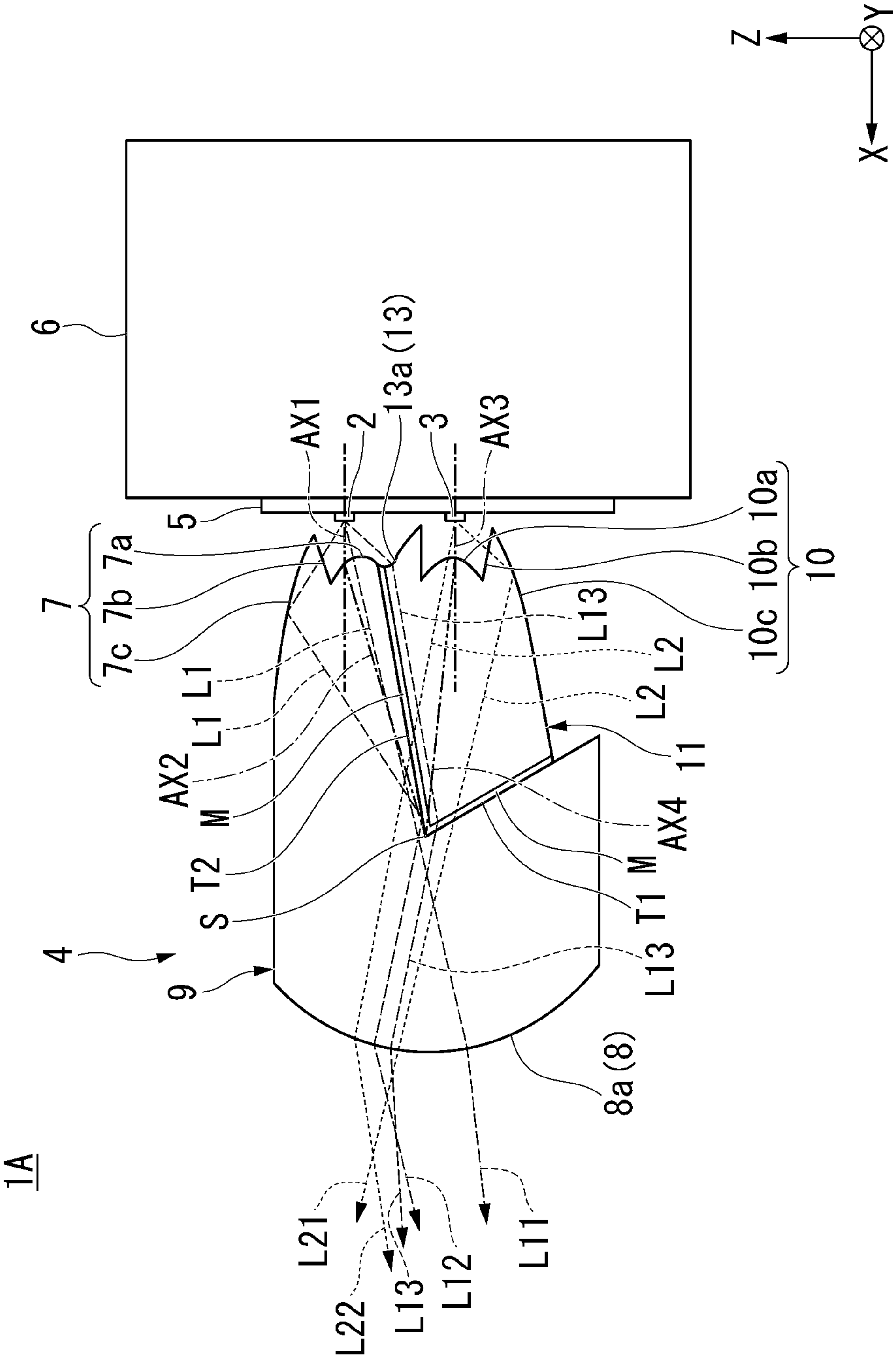
FIG. 3 is a vertical cross-sectional view showing a configuration of the vehicle lamp shown in FIG. 1.
Figure 4:
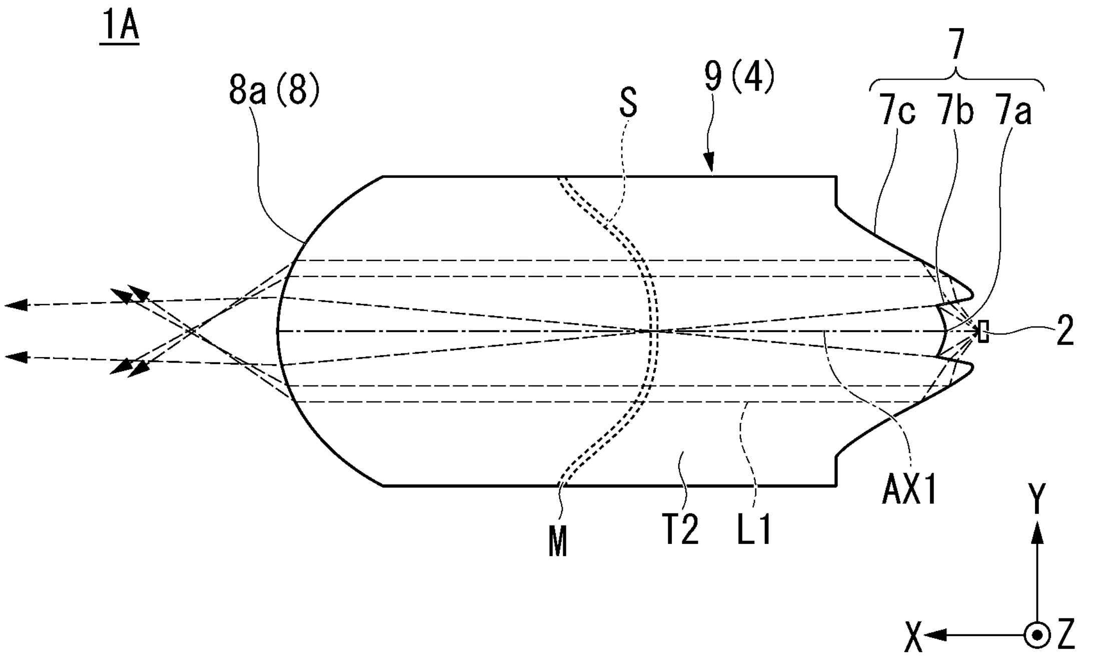
FIG. 4 is a horizontal cross-sectional view showing a configuration of the vehicle lamp shown in FIG. 1 on the side of a first incidence part.
Figure 5:
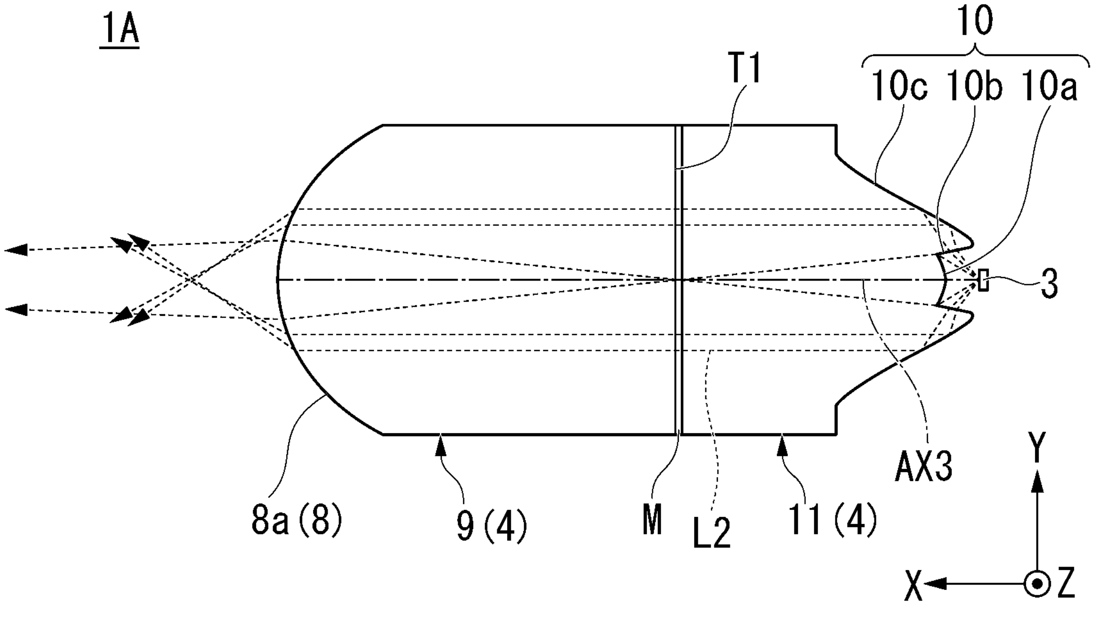
FIG. 5 is a horizontal cross-sectional view showing a configuration of the vehicle lamp shown in FIG. 1 on the side of a second incidence part.
Figure 6:
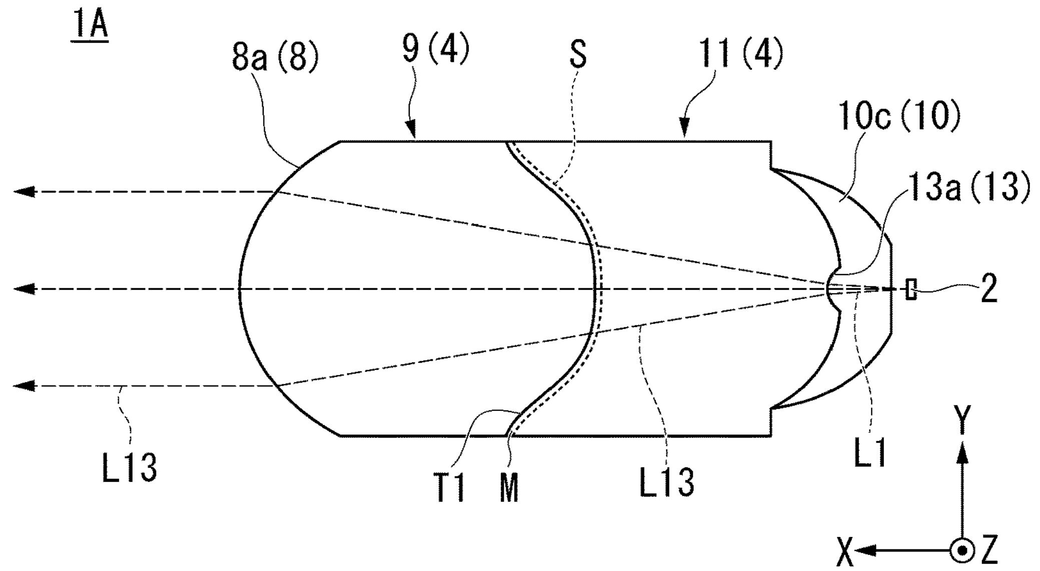
FIG. 6 is a horizontal cross-sectional view showing a configuration of the vehicle lamp shown in FIG. 1 on the side of a third incidence part.

Further, FIG. 1 is a perspective view showing a configuration of the vehicle lamp 1A. FIG. 2 is an exploded perspective view showing a configuration of the vehicle lamp 1A. FIG. 3 is a vertical cross-sectional view of a configuration of the vehicle lamp 1A. FIG. 4 is a horizontal cross-sectional view showing a configuration of the vehicle lamp 1A on the side of a first incidence part 7. FIG. 5 is a horizontal cross-sectional view showing a configuration of the vehicle lamp 1A on the side of a second incidence part 10. FIG. 6 is a horizontal cross-sectional view showing a configuration of the vehicle lamp 1A on the side of a third incidence part 13.

The vehicle lamp 1A of the embodiment is obtained by applying the present invention to a headlight (headlamp) for a vehicle, and radiates a passing beam (low beam) that forms a light distribution pattern for a low beam including a cutoff line on an upper end and a traveling beam (high beam) that forms a light distribution pattern for a high beam above a light distribution pattern for a low beam toward a side in front of the vehicle (+X-axis direction) while being able to switch between the passing beam (low beam) and the traveling beam (high beam).

Specifically, as shown in FIG. 1 to FIG. 6, the vehicle lamp 1A schematically includes a first light source 2 configured to emit first light L1, a second light source 3 configured to emit second light L2, and a projection lens 4 configured to project the first light L1 and the second light L2, which are inside a lighting body (not shown).

Further, the lighting body is constituted by a housing having a front surface with an opening, and a transparent lens cover configured to cover the opening of the housing. In addition, a shape of the lighting body can be appropriately changed according to a design or the like of the vehicle.

The first light source 2 and the second light source 3 are constituted by, for example, light emission diodes (LEDs) configured to emit white light. In addition, a high output (high brightness) type LED (for example, SMD LED or the like) for vehicle illumination can be used as the LED. Further, the first light source 2 and the second light source 3 can use, for example, a light emitting element such as a laser diode (LD) or the like, in addition to the above-mentioned LED.

In the vehicle lamp 1A of the embodiment, the first light source 2 and the second light source 3 are arranged in a vertical direction (upward/downward direction) of the vehicle lamp 1A while being disposed adjacent to each other. Among these, one LED that constitutes the first light source 2 is disposed above, and one LED that constitutes the second light source 3 is disposed below.

The first light source 2 and the second light source 3 are mounted on one surface (in the embodiment, a front surface) side of a circuit board 5 on which a driving circuit configured to drive the LEDs is provided. Accordingly, the first light source 2 and the second light source 3 radially emit the first light L1 and the second light L2 forward (a+X axis side). That is, the first light source 2 and the second light source 3 are provided on the same surface of the same circuit board 5 and configured to radially emit the first light L1 and the second light L2 in the same direction.

In addition, a heat sink 6 configured to radiate heat emitted from the first light source 2 and the second light source 3 is attached to the circuit board 5 on the side of the other surface (in the embodiment, a back surface). The heat sink 6 is constituted by, for example, an extruded molding body formed of a metal such as aluminum or the like having high thermal conductivity. The heat sink 6 has a base portion 6*a* in contact with the circuit board 5, and a plurality of fin portions 6*b* configured to increase heat dissipation of heat transferred from the circuit board 5 to the base portion 6*a*.

Further, while a configuration in which the LEDs that constitute the first light source 2 and the second light source 3 and the driving circuit configured to drive the LEDs are mounted on the circuit board 5 is provided in the embodiment, the mounting board on which the LEDs are mounted and the circuit board on which the driving circuit configured to drive the provided LEDs may be separately disposed, the mounting board and the circuit board may be electrically connected via a wiring cord referred to as a harness, and the driving circuit may be protected from heat emitted from the LEDs.

The projection lens 4 has a first lens body 9 including the first incidence part 7 located in an area facing the first light source 2 and an emission part 8 located opposite to the first incidence part 7, and a second lens body 11 including the second incidence part located in an area facing the second light source 3 and the third incidence part 13 located between the first incidence part 7 and the second incidence part 10.

In the projection lens 4, a refractive index of the second lens body 11 is smaller than a refractive index of the first lens body 9. In the embodiment, for example, the first lens body 9 is formed of a polycarbonate resin (PC), and the second lens body 11 is formed of an acryl resin (PMMA).

Further, a combination of materials of the first lens body 9 and the second lens body 11 having different refractive indices is not limited to such a combination and may be appropriately changed. In addition, the material is not limited to the above-mentioned resin having optical transparency and glass may be used.

The projection lens 4 has a structure in which the first lens body 9 and the second lens body 11 abut each other via an intermediate layer M in a state in which a first boundary surface T1, which is provided between the first lens body 9 and the second lens body 11 and between the emission part 8 and the third incidence part 13, and a second boundary surface T2, which is provided between the first lens body 9 and the second lens body 11 and which extends from a boundary line S with respect to the first boundary surface T1 until the first incidence part 7 and the third incidence part 13, are interposed between the first lens body 9 and the second lens body 11.

The intermediate layer M is formed of an adhesive agent with optical transparency that bonds the first lens body 9 and the second lens body 11. In addition, a thickness of the intermediate layer M may be thick enough to bond the first lens body 9 and the second lens body 11.

In the projection lens 4, a refractive index of the intermediate layer M is smaller than a refractive index of the first lens body 9. In addition, a refractive index of the second lens body 11 is equal to or smaller than the refractive index of the intermediate layer M. That is, the refractive index of the second lens body 11 is equal to the refractive index of the intermediate layer M, or the refractive index of the intermediate layer M is greater than the refractive index of the second lens body 11.

Meanwhile, when a difference (critical angle) between the refractive indices of the first lens body 9 and the intermediate layer M is increased, the intermediate layer M having a refractive index closer to that of the second lens body 11 is preferably used. For the intermediate layer M, it is possible to appropriately select and use an adhesive agent that satisfies such a condition from known adhesive agents.

The first boundary surface T1 is constituted by a surface that divides between the first lens body 9 and the second lens body 11 downward from the boundary line S, and further, is inclined diagonally rearward from the boundary line S. The second boundary surface T2 is constituted by a surface that divides between the first lens body 9 and the second lens body 11 rearward from the boundary line S, and further, is inclined diagonally upward from the boundary line S.

Accordingly, the first boundary surfaces T1 and the second boundary surfaces T2 are disposed at an acute angle while having the boundary line S disposed therebetween. The boundary line S defines a cutoff line of the above-mentioned light distribution pattern for a low beam while extending in the horizontal direction (leftward/rightward direction) of the vehicle lamp 1A.

The first lens body 9 and the second lens body 11 are bonded via the intermediate layer M, which serves as an adhesive agent, without having the air layer present between the first boundary surfaces T1 and between the second boundary surfaces T2 by abutting the respective first boundary surface T1 and the respective second boundary surface T2 against each other via the intermediate layer M.

In addition, the first lens body 9 has a pair of arm portions 9*a* and 9*b*. The pair of arm portions 9*a* and 9*b* are provided to extend rearward from both upper and lower sides of the first lens body 9. In addition, tip sides of the pair of arm portions 9*a* and 9*b* have shapes that are bent away from each other.

In the projection lens 4, the pair of arm portions 9*a* and 9*b* are fixed to a fixing position such as a bracket or the like in the lighting body by screwing together with the circuit board 5. Accordingly, the first lens body 9 and the second lens body 11 are positioned and fixed to the first light source 2 and the second light source 3 in a state in which an interval between the first light source 2 and the second light source 3 and between the first incidence part 7 and the second incidence part 10 are maintained.

The first incidence part 7 has a first condensing incidence surface 7*a* having a convex surface shape located at a portion opposite to the first light source 2 and into which some of the first light L1 emitted from the first light source 2 enters, a second condensing incidence surface 7*b* having a substantially cylindrical shape, located on an inner circumferential side of a portion protruding toward the first light source 2 from a position surrounding the first condensing incidence surface 7*a* and into which some of the first light L1 emitted from the first light source 2 enters, and a condensing reflection surface 7*c* having a truncated conical shape located on an outer circumferential side of the protruded portion and configured to reflect the first light L1 entering from the second condensing incidence surface 7*b*.

In addition, since the first incidence part 7 is adjacent to the third incidence part 13 while having the second boundary surface T2 sandwiched therebetween, the first incidence section 7 has a shape in which parts on the lower sides of the first condensing incidence surface 7*a*, the second condensing incidence surface 7*b* and the condensing reflection surface 7*c* are cut out along the second boundary surface T2.

In the first incidence part 7, among the first light L1 radially emitted from the first light source 2, the first light L1 entering the inside of the first lens body 9 from the first condensing incidence surface 7*a* is condensed closer to the optical axis. Meanwhile, the first light L1 entering the inside of the first lens body 9 from the second condensing incidence surface 7*b* is reflected at the condensing reflection surface 7*c* and condensed closer to the optical axis.

Accordingly, the first light L1 entering the inside of the first lens body 9 from the first incidence part 7 is guided toward the front of the first lens body 9 while being condensed closer to an optical axis AX2, which is inclined downward diagonally than an optical axis AX1 of the first light L1 emitted from the first light source 2, in the vertical cross section of the vehicle lamp 1A shown in FIG. 3.

Meanwhile, the first light L1 entering the inside of the first lens body 9 from the first incidence part 7 is guided toward the front of the first lens body 9 while being parallelized with respect to the optical axis AX1 of the first light L1 in the horizontal cross section of the vehicle lamp 1A shown in FIG. 4. Further, regarding the first incidence part 7, in the horizontal cross section of the vehicle lamp 1A, a configuration in which the first light L1 enters the inside of the first lens body 9 while being condensed closer to the optical axis AX1 may be used.

In addition, the first light L1 entering the inside of the first lens body 9 from the first incidence part 7 is guided toward the emission part 8 in front of the first lens body 9. Among these, the first light L1 entering the second boundary surface T2 is guided toward the emission part 8 after being reflected at the second boundary surface T2.

That is, in the second boundary surface T2, since the refractive index of the intermediate layer M made to be smaller than the refractive index of the first lens body 9, the first light L1 entering the second boundary surface T2 can be totally reflected toward the emission part 8.

The second incidence part 10 has a first condensing incidence surface 10*a* having a convex surface shape, disposed at a portion opposite to the second light source 3 and into which some of the second light L2 entering from the second light source 3 enters, a second condensing incidence surface 10*b* having a substantially cylindrical shape located on an inner circumferential side of a portion protruding toward the second light source 3 from a position around the first condensing incidence surface 10*a* and into which some of the second light L2 emitted from the second light source 3 enters, and a condensing reflection surface 10*c* having a truncated conical shape located on an outer circumferential side of the protruded portion and configured to reflect the second light L2 entering from the second condensing incidence surface 10*b*.

In the second incidence part 10, among the second light L2 radially emitted from the second light source 3, the second light L2 entering the inside of the second lens body 11 from the first condensing incidence surface 10*a* is condensed closer to the optical axis. Meanwhile, the second light L2 entering the inside of the second lens body 11 from the second condensing incidence surface 10*b* is reflected by the condensing reflection surface 10*c* and is condensed to closer to the optical axis.

Accordingly, the second light L2 entering the inside of the second lens body 11 from the second incidence part 10 is guided toward the front of the second lens body 11 while being condensed closer to an optical axis AX4, which is inclined upward diagonally than an optical axis AX3 of the second light L2 emitted from the second light source 3, in the vertical cross section of the vehicle lamp 1A shown in FIG. 3.

Meanwhile, the second light L2 entering the inside of the second lens body 11 from the second incidence part 10 is guided toward the front of the second lens body 11 while being parallelized with respect to the optical axis AX3 of the second light L2 in the horizontal cross section of the vehicle lamp 1A shown in FIG. 5. Further, for the second incidence part 10, in the horizontal cross section of the vehicle lamp 1A, a configuration in which the second light L2 enters the inside of the second lens body 11 while being condensed closer to the optical axis AX3 may be used.

In addition, the second light L2 entering the inside of the second lens body 11 from the second incidence part 10 passes through the first boundary surface T1 and the second boundary surface T2 in front of the second lens body 11 and enters the inside of the first lens body 9. The second light L2 entering the inside of the first lens body 9 is guided toward the emission part 8.

That is, in the first boundary surface T1 and the second boundary surface T2, since the refractive index of the intermediate layer M and the second lens body 11 are made smaller than the refractive index of the first lens body 9, the second light L2 entering the first boundary surface T1 and the second boundary surface T2 can pass therethrough toward the emission part 8.

In addition, in the second boundary surface T2, since the refractive index of the intermediate layer M and the second lens body 11 are made smaller than the refractive index of the first lens body 9, and thus, the second light L2 entering the second boundary surface T2 can pass therethrough toward in front of the emission part 8 while being refracted downward. Accordingly, in the projection lens 4, a height dimension can be minimized and reduction in the entire thickness can be achieved.

The third incidence part 13 has a diffusion incidence surface 13*a* having a concave surface shape located above the condensing reflection surface 10*c* and into which some of the first light L1 emitted from the first light source 2 enters.

In the third incidence part 13, among the first light L1 radially emitted from the first light source 2, first light L13 entering the inside of the second lens body 11 from the diffusion incidence surface 13*a* located below the portion facing the first light source 2 is diffused.

Accordingly, the first light L13 entering the inside of the second lens body 11 from the third incidence part 13 is guided toward the front of the second lens body 11 while being diffused toward the vicinity of the boundary line S in the vertical cross section of the vehicle lamp 1A shown in FIG. 3.

Meanwhile, the first light L13 entering the inside of the second lens body 11 from the third incidence part 13 is diffused and guided toward the front of the second lens body 11 in the horizontal cross section of the vehicle lamp 1A shown in FIG. 6.

In addition, the first light L13 entering the inside of the second lens body 11 from the third incidence part 13 passes through the first boundary surface T1 in front of the second lens body 11 and enters the inside of the first lens body 9. The first light L13 entering the inside of the first lens body 9 and is guided toward the emission part 8.

That is, in the first boundary surface T1, since the refractive index's of the intermediate layer M and the second lens body 11 are made smaller than the refractive index of the first lens body 9, the first light L13 entering the first boundary surface T1 can pass therethrough toward the emission part 8 on the front side while being refracted upward.

The emission part 8 has an emission surface 8*a* on the front surface side of the first lens body 9. The emission surface 8*a* is constituted by a convex lens surface having a spherical surface shape or a non-spherical surface shape that condenses the first light L1 and the second light L2 in the vertical direction (a direction in which the first light source 2 and the second light source 3 are arranged) and a horizontal direction (a direction in which the boundary line S extends) of the vehicle lamp 1A. In addition, a focus of the convex lens surface is set to the boundary line S or the vicinity thereof.

In the emission part 8, the first light L1 and the second light L2 guided to the inside of the first lens body 9 are emitted to the outside of the first lens body 9 while being condensed by the emission surface 8*a*. In addition, in the emission part 8, after the first light L1 and the second light L2 emitted from the emission surface 8*a* are condensed, the lights are diffused in the horizontal direction and the vertical direction of the vehicle lamp 1A, and thus, the first light L1 and the second light L2 are enlarged and projected toward the front of the first lens body 9 (the projection lens 4).

Further, in the surfaces that constitute the first lens body 9 and the second lens body 11, for the other surfaces, illustration and description of which are omitted, it is possible to freely design (for example, shielding or the like) the surfaces within a range in which a bad influence is not applied to the first light L1 and the second light L2 passing through the inside of the first lens body 9 and the second lens body 11.

In the vehicle lamp 1A of the embodiment having the above-mentioned configuration, the first light L1 emitted from the first light source 2 is projected in the direction of advance of the vehicle by the projection lens 4 as a passing beam (low beam). Here, the first light L1 projected toward the front of the projection lens 4 forms a light distribution pattern for a low beam (first light distribution pattern) including a cutoff line defined by the boundary line S on the upper end by inverting and projecting a light source image formed in the vicinity of the focus of the emission surface 8*a*.

Meanwhile, in the vehicle lamp 1A of the embodiment, the first light L1 and the second light L2 emitted from the first light source 2 and the second light source 3 are projected in the direction of advance of the vehicle by the projection lens 4 as a traveling beam (high beam). Here, the second light L2 projected toward the front of the projection lens 4 forms a second light distribution pattern located above the light distribution pattern for a low beam (first light distribution pattern). The light distribution pattern for a high beam is formed by overlapping the second light distribution pattern and the light distribution pattern for a low beam (second light distribution pattern) formed by the first light L1.

In the vehicle lamp 1A of the embodiment, the first light L1 emitted from the first light source 2 enters the inside of the first lens body 9 from the first incidence part 7. Here, the first light L1 entering the inside of the first lens body 9 from the first incidence part 7 is guided toward the front of the first lens body 9 while being condensed closer to the optical axis AX2 diagonally inclined downward than the optical axis AX1 of the first light L1 emitted from the first light source 2 in the vertical cross section of the vehicle lamp 1A shown in FIG. 3.

Among these, the first light L11 guided toward the emission part 8 is emitted to the outside of the first lens body 9 from the emission part 8. Accordingly, the first light L11 forms a light distribution pattern below a line H-H in a light distribution pattern LP for a low beam shown in FIG. 15.

Meanwhile, the first light L12 entering the second boundary surface T2 is guided toward the emission part 8 after being reflected by the second boundary surface T2, and emitted to the outside of the first lens body 9 from the emission part 8. Accordingly, the first light L12 forms a light distribution pattern in the vicinity of a cutoff line CL in the light distribution pattern LP for a low beam shown in FIG. 15.

In addition, in the vehicle lamp 1A of the embodiment, the second light L2 emitted from the second light source 3 enters the inside of the second lens body 11 from the second incidence part 10. Here, the second light L2 entering the inside of the second lens body 11 from the second incidence part 10 is guided toward the front of the second lens body 11 while being condensed closer to the optical axis AX4 diagonally inclined upward than the optical axis AX3 of the second light L2 emitted from the second light source 3 in the vertical cross section of the vehicle lamp 1A shown in FIG. 3.

Among these, second light L21 entering the first boundary surface T1 passes through the first boundary surface T1 and enters the inside of the first lens body 9, and then, is guided toward the emission part 8 and emitted to the outside of the first lens body 9 from the emission part 8. Accordingly, the second light L21 forms a light distribution pattern above a line H-H in a light distribution pattern HP for a high beam shown in FIG. 15.

Meanwhile, the second light L22 entering the second boundary surface T2 passes through the second boundary surface T2 and enters the inside of the first lens body 9, and then, is guided toward the emission part 8 and emitted to the outside of the first lens body 9 from the emission part 8.

Accordingly, the second light L22 forms a light distribution pattern below the light distribution pattern HP for a high beam shown in FIG. 15.

In addition, the second light L22 entering the second boundary surface T2 is made to approach a position or a beam angle of the first light L12 reflected by the second boundary surface T2 when passing through the second boundary surface T2. Accordingly, since the second light L22 is emitted below the cutoff line CL of the light distribution pattern LP for a low beam, it is possible to overlap a lower side of the light distribution pattern HP for a high beam and the cutoff line CL of the light distribution pattern LP for a low beam shown in FIG. 15.

In addition, in the vehicle lamp 1A of the embodiment, some of the first light L1 emitted from the first light source 2 enters the inside of the second lens body 11 from the third incidence part 13. Here, the first light L13 entering the inside of the second lens body 11 from the third incidence part 13 is guided toward the front of the second lens body 11 while being diffused toward the vicinity of the boundary line S in the vertical cross section of the vehicle lamp 1A shown in FIG. 3.

Among these, the first light L13 entering the first boundary surface T1 passes through the first boundary surface T1 and enters the inside of the first lens body 9, and then, is guided toward the emission part 8 and emitted to the outside of the first lens body 9 from the emission part 8. Accordingly, the first light L13 forms a light distribution pattern for overhead (third light distribution pattern) OP to irradiate a traffic sign or the like above the cutoff line CL in the light distribution pattern LP for a low beam shown in FIG. 15.

As described above, in the vehicle lamp 1A of the embodiment, it is possible to obtain the good light distribution pattern LP for a low beam, the light distribution pattern HP for a high beam and the light distribution pattern OP for overhead required for the light distribution pattern LP for a low beam, by projecting the first light L1 and the second light L2 emitted from the first light source 2 and the second light source 3 using the projection lens 4.

In addition, in the vehicle lamp 1A of the embodiment, the first lens body 9 and the second lens body 11 that constitute the above mentioned projection lens 4 are coupled via the intermediate layer M without having an air layer present between the first boundary surfaces T1 and the second boundary surfaces T2 by causing the respective first boundary surface T1 and the respective second boundary surface T2 to abut against each other via the intermediate layer M.

Accordingly, in the vehicle lamp 1A of the embodiment, it is possible to prevent occurrence of Fresnel loss at between the first boundary surfaces T1 and between the second boundary surfaces T2, and it is possible to increase utilization efficiency of the first light L1 and the second light L2 emitted from the first light source 2 and the second light source 3.

Further, in the vehicle lamp 1A of the embodiment, reduction in the entire thickness can be achieved by minimizing a height dimension of the projection lens 4.

Second Embodiment

Next, for example, a vehicle lamp 1B shown in FIG. 7 to FIG. 12 will be described as a second embodiment of the present invention.

Figure 7:
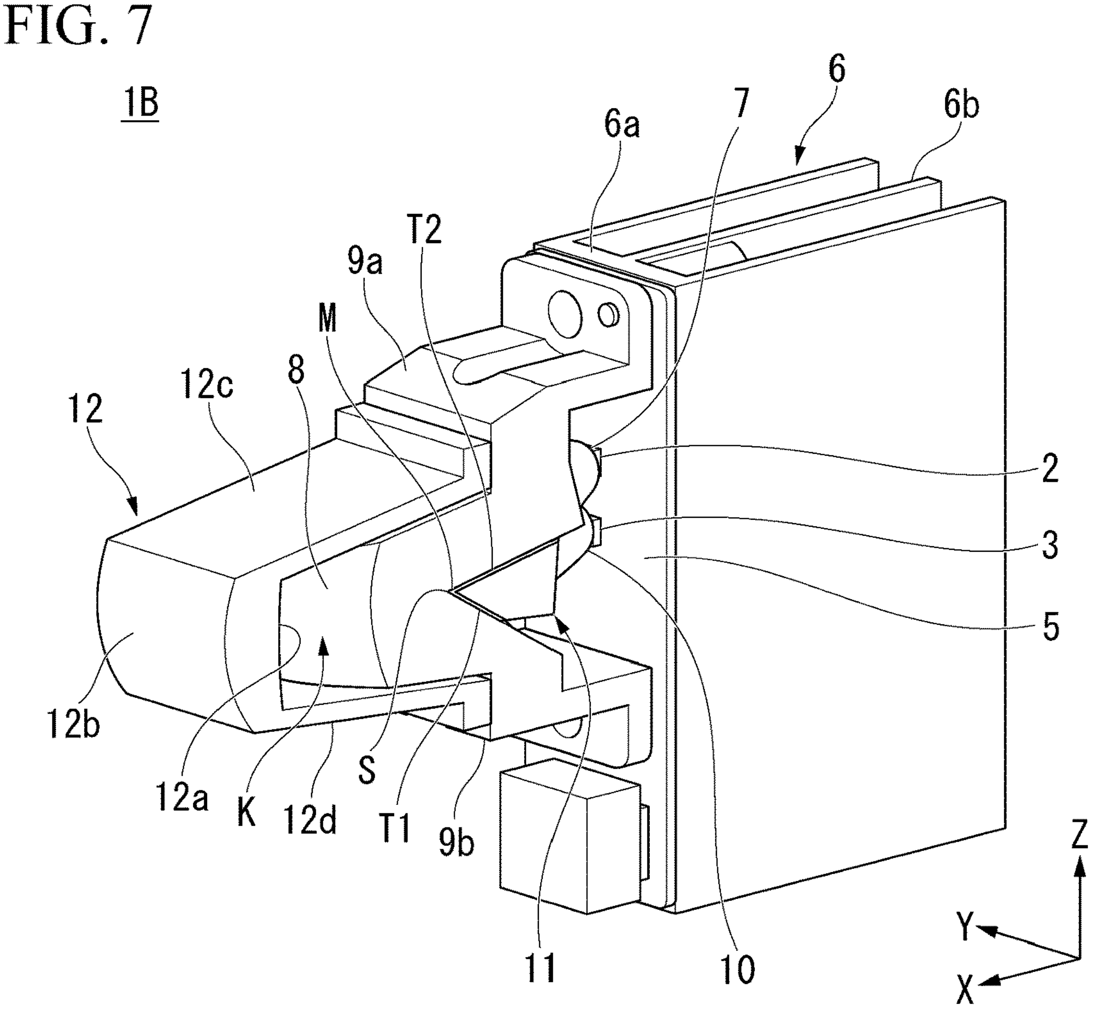
FIG. 7 is a perspective view showing a configuration of a vehicle lamp according to a second embodiment of the present invention.
Figure 8:
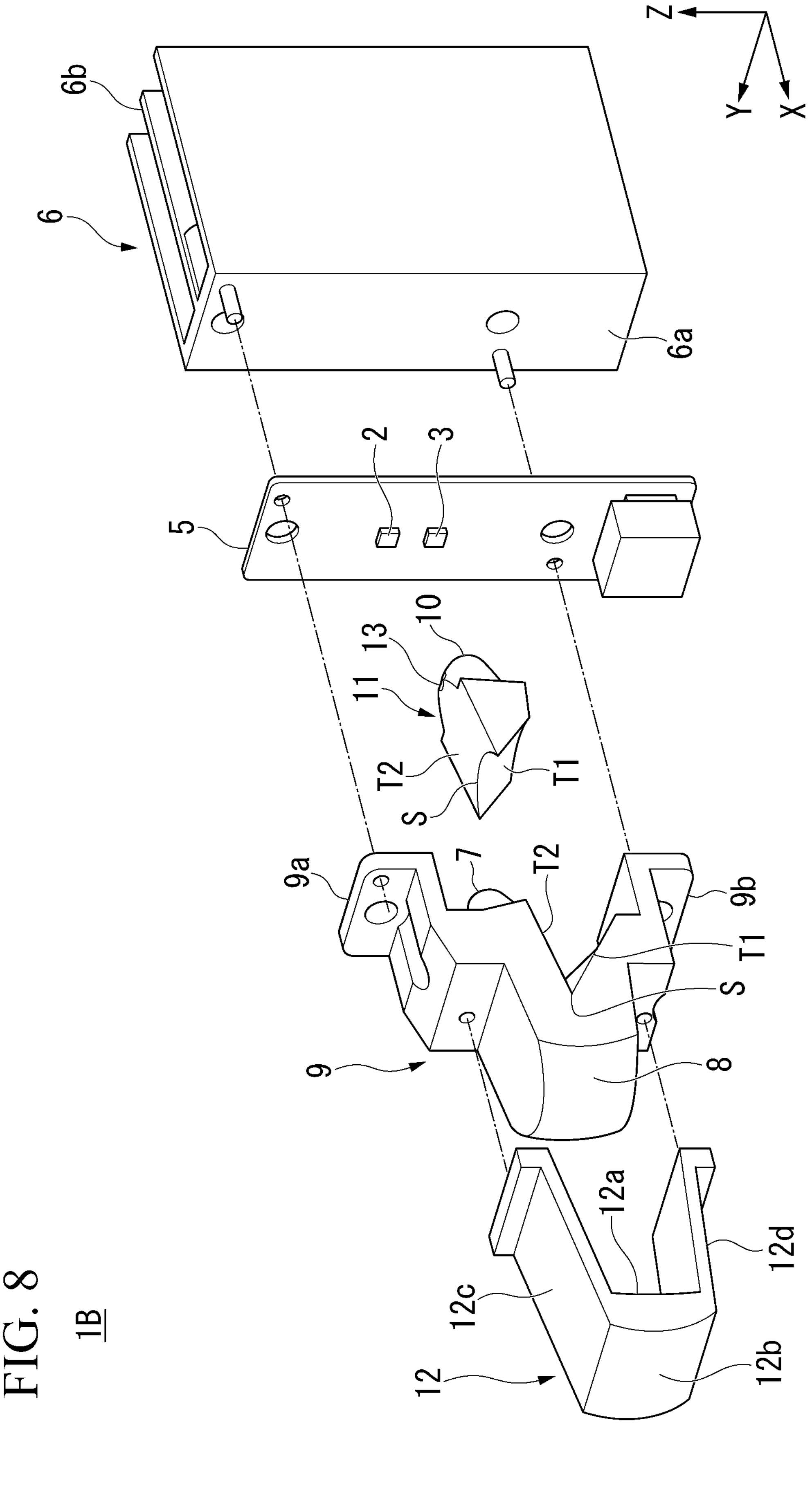
FIG. 8 is an exploded perspective view showing a configuration of the vehicle lamp shown in FIG. 7.
Figure 9:
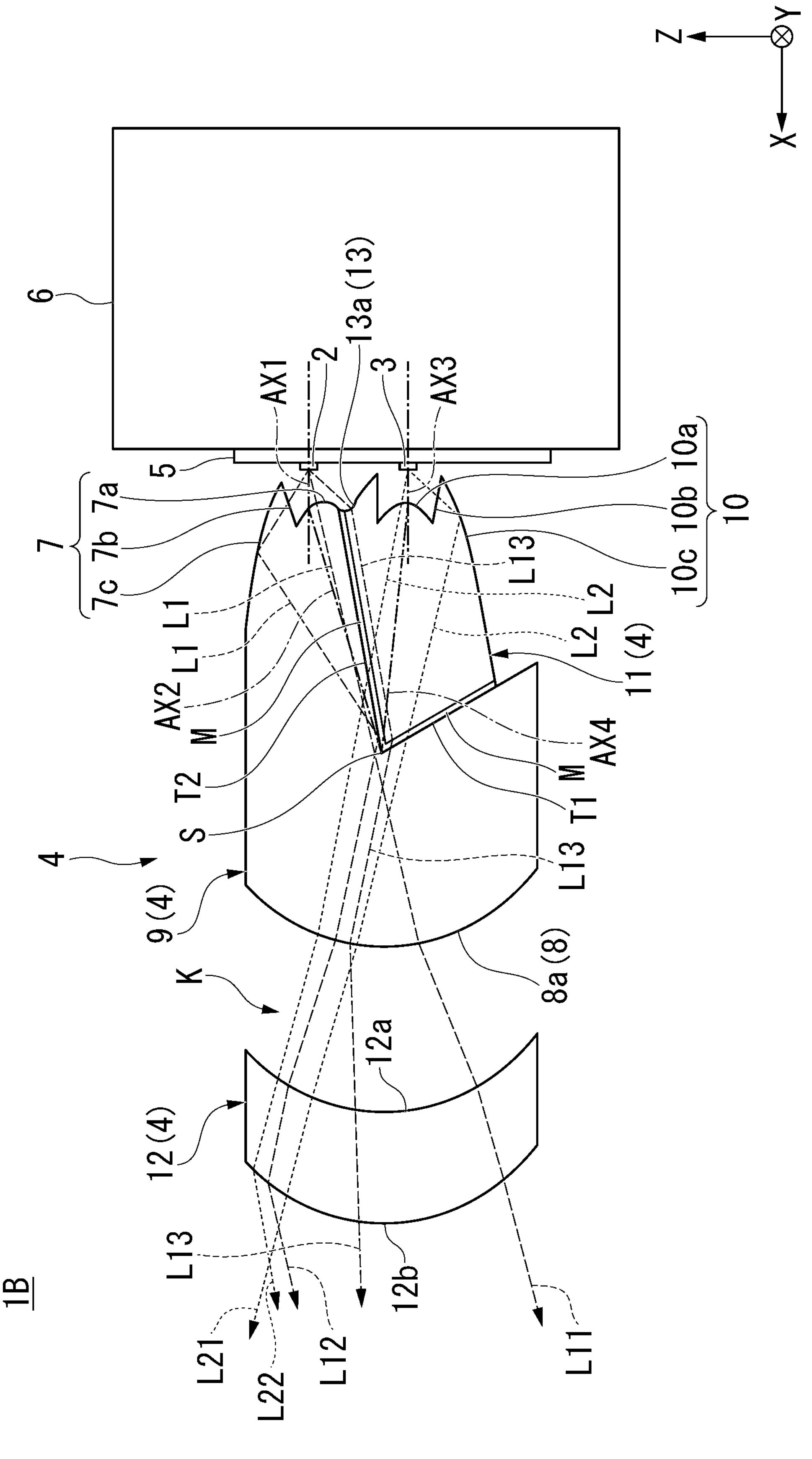
FIG. 9 is a vertical cross-sectional view showing a configuration of the vehicle lamp shown in FIG. 7.
Figure 10:
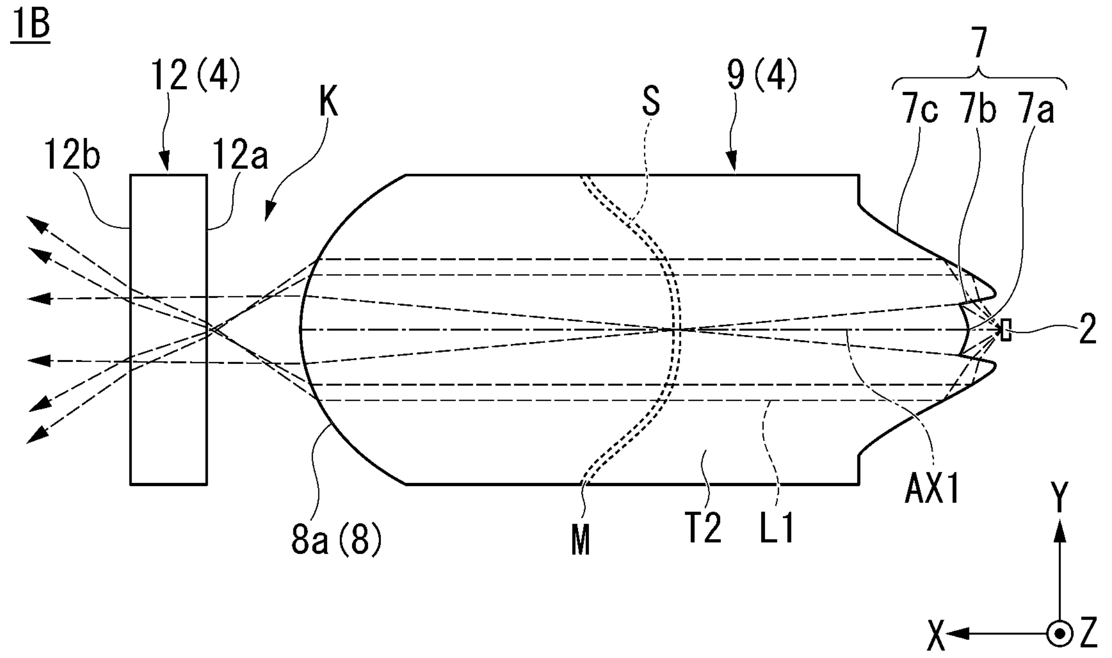
FIG. 10 is a horizontal cross-sectional view showing a configuration of the vehicle lamp shown in FIG. 7 on the side of a first incidence part.
Figure 11:
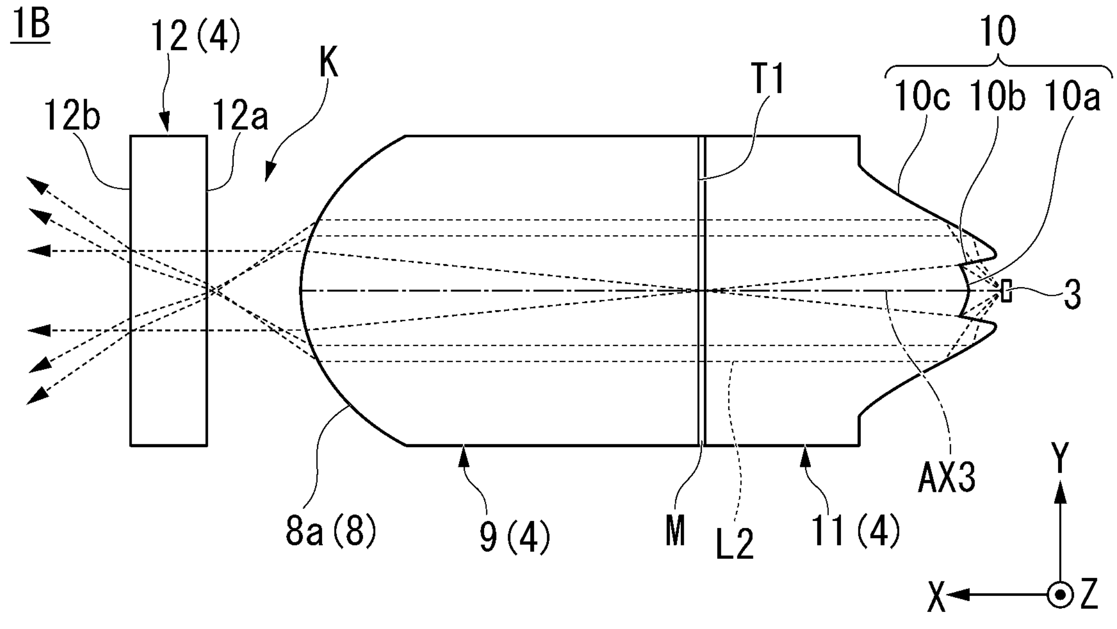
FIG. 11 is a horizontal cross-sectional view showing a configuration of the vehicle lamp shown in FIG. 7 on the side of a second incidence part.
Figure 12:
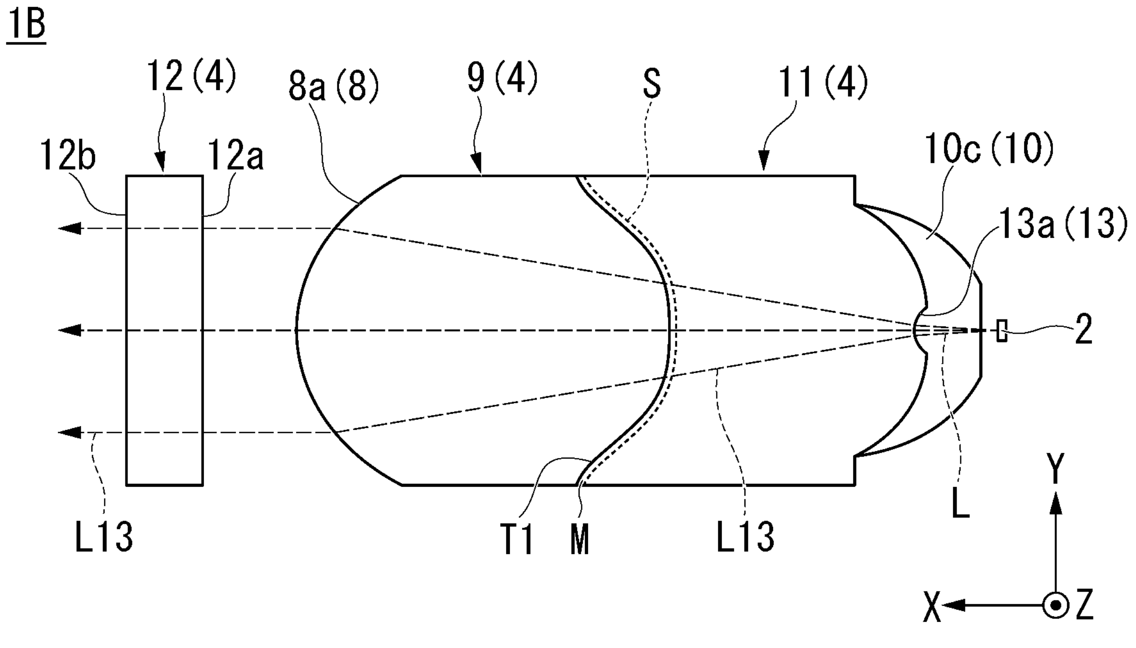
FIG. 12 is a horizontal cross-sectional view showing a configuration of the vehicle lamp shown in FIG. 7 on the side of a third incidence part.

Further, FIG. 7 is a perspective view showing a configuration of the vehicle lamp 1B. FIG. 8 is an exploded perspective view showing a configuration of the vehicle lamp 1B. FIG. 9 is a vertical cross-sectional view showing a configuration of the vehicle lamp 1B. FIG. 10 is a horizontal cross-sectional view showing a configuration of the vehicle lamp 1B on the side of the first incidence part 7. FIG. 11 is a horizontal cross-sectional view showing a configuration of the vehicle lamp 1B on the side of the second incidence part 10. FIG. 12 is a horizontal cross-sectional view showing a configuration of the vehicle lamp 1B on the side of the third incidence part 13. In addition, in the following description, in the same areas as the vehicle lamp 1A, description thereof will be omitted, and the same reference signs in the drawings are designated to the areas.

As shown in FIG. 7 to FIG. 12, the vehicle lamp 1B of the embodiment includes a third lens body 12 that constitutes a projection lens 4, in addition to the configuration of the vehicle lamp 1A.

That is, the projection lens 4 has the third lens body 12 located on a side facing the emission part 8, together with the first lens body 9 and the second lens body 11.

The third lens body 12 has an incidence surface 12*a* on which first light L1 and second light L2 enter on the side of a back surface thereof, and an emission surface 12*b* from which the first light L1 and the second light L2 are emitted on the side of a front surface thereof.

The incidence surface 12*a* is constituted by a substantially semi-columnar convex lens surface, a column axis of which extends in the horizontal direction, to condense the first light L1 and the second light L2 in the vertical direction of the vehicle lamp 1A.

The emission surface 12*b* is constituted by a substantially semi-columnar convex lens surface, a column axis of which extends in the horizontal direction, to condense the first light L1 and the second light L2 in the vertical direction of the vehicle lamp 1A.

In addition, in the vehicle lamp 1B of the embodiment, a synthetic focus of a synthetic lens constituted by the emission surface 8*a* of the first lens body 9 and the incidence surface 12*a* and the emission surface 12*b* of the third lens body 12 is set to the boundary line S or the vicinity thereof.

Further, for the emission part 8, while a configuration having the emission surface 8*a* that condenses the first light L1 and the second light L2 is provided in the vertical direction and the horizontal direction of the vehicle lamp 1A, a configuration having the emission surface 8*a* that condenses the first light L1 and the second light L2 only in the horizontal direction of the vehicle lamp 1A may be provided when the third lens body 12 is provided.

In this case, the emission surface 8*a* can be constituted by a substantially semi-columnar convex lens surface, a column axis of which extends in the vertical direction, to condense the first light L1 and the second light L2 in the horizontal direction of the vehicle lamp 1A.

In addition, for the third lens body 12, the incidence surface 12*a* is not limited to being constituted by the convex lens surface, and the incidence surface 12*a* may be constituted by a plane.

The third lens body 12 is integrally assembled to the first lens body 9 in a state in which an air layer K is provided between the third lens body 12 and the emission part 8. The third lens body 12 has a pair of arm portions 12*c* and 12*d*. The pair of arm portions 12*c* and 12*d* are provided to extend rearward from both upper and lower sides of the third lens body 12. In addition, tip sides of the pair of arm portions 12*c* and 12*d* have a shape folded in separating directions.

In the projection lens 4, the pair of arm sections 12*c* and 12*d* are positioned and fixed to the first lens body 9 in a state in which the first lens body 9 is sandwiched between the pair of arm portions 12*c* and 12*d*. Accordingly, the first lens body 9 and the third lens body 12 are integrally assembled in a state in which the air layer K is provided between the incidence surface 12*a* and the emission surface 8*a*.

Further, in the surfaces that constitute the third lens body 12, the other surfaces, illustration or description of which is omitted, can be freely designed (for example, shielding) within a range in which a bad influence is not applied to the first light L1 and the second light L2 passing through the inside of the third lens body 12.

In the vehicle lamp 1B of the embodiment having the above-mentioned configuration, the first light L1 emitted from the first light source 2 is projected in the direction of advance of the vehicle by the projection lens 4 as a passing beam (low beam). Here, the first light L1 projected toward the front of the projection lens 4 forms a light distribution pattern for a low beam (first light distribution pattern) including a cutoff line defined by the boundary line S on the upper end by inverting and projecting the light source image formed in the vicinity of the focus of the above-mentioned synthetic lens.

Meanwhile, in the vehicle lamp 1B of the embodiment, the first light L1 and the second light L2 emitted from the first light source 2 and the second light source 3 are projected in the direction of advance of the vehicle by the projection lens 4 as a traveling beam (high beam). Here, the second light L2 projected toward the front of the projection lens 4 forms a second light distribution pattern located above the light distribution pattern for a low beam (first light distribution pattern). The light distribution pattern for a high beam is formed by overlapping the second light distribution pattern and the light distribution pattern for a low beam (second light distribution pattern) formed by the first light L1.

In the vehicle lamp 1B of the embodiment, the first light L1 emitted from the first light source 2 enters the inside of the first lens body 9 from the first incidence part 7. Here, the first light L1 entering the inside of the first lens body 9 from the first incidence part 7 is guided toward the front of the first lens body 9 while being condensed closer to the optical axis AX2, which is inclined downward diagonally than the optical axis AX1 of the first light L1 emitted from the first light source 2, in the vertical cross section of the vehicle lamp 1B shown in FIG. 9.

Among these, the first light L11 guided toward the emission part 8 is emitted to the outside of the first lens body 9 from the emission part 8. Further, the first light L11 emitted to the outside of the first lens body 9 enters the inside of the third lens body 12 from the incidence surface 12*a* via the air layer K and is emitted to the outside of the third lens body 12 from the emission surface 12*b*. Accordingly, the first light L11 forms a light distribution pattern below a line H-H in the light distribution pattern LP for a low beam shown in FIG. 15.

Meanwhile, the first light L12 entering the second boundary surface T2 is guided toward the emission part 8 after being reflected at the second boundary surface T2, and is emitted to the outside of the first lens body 9 from the emission part 8. Further, the first light L12 emitted to the outside of the first lens body 9 enters the inside of the third lens body 12 from the incidence surface 12*a* via the air layer K, and is emitted to the outside of the third lens body 12 from the emission surface 12*b*. Accordingly, the first light L12 forms a light distribution pattern in the vicinity of the cutoff line CL in the light distribution pattern LP for a low beam shown in FIG. 15.

In addition, in the vehicle lamp 1B of the embodiment, the second light L2 emitted from the above mentioned second light source 3 enters the inside of the second lens body 11 from the second incidence part 10. Here, the second light L2 entering the inside of the second lens body 11 from the second incidence part 10 is guided toward the front of the second lens body 11 while being condensed closer to the optical axis AX4, which is inclined upward diagonally than the optical axis AX3 of the second light L2 emitted from the second light source 3, in the vertical cross section of the vehicle lamp 1A shown in FIG. 9.

Among these, the second light L21 entering the first boundary surface T1 passes through the first boundary surface T1 and enters the inside of the first lens body 9, and then, is guided toward the emission part 8 and is emitted to the outside of the first lens body 9 from the emission part 8. Further, the second light L21 emitted to the outside of the first lens body 9 enters the inside of the third lens body 12 from the incidence surface 12*a* via the air layer K, and is emitted to the outside of the third lens body 12 from the emission surface 12*b*. Accordingly, the second light L21 forms a light distribution pattern above a line H-H in the light distribution pattern HP for a high beam shown in FIG. 15.

Meanwhile, the second light L22 entering the second boundary surface T2 passes through this second boundary surface T2 and enters the inside of the first lens body 9, and then, is guided toward the emission part 8 and emitted to the outside of the first lens body 9 from the emission part 8. Further, the second light L22 emitted to the outside of the first lens body 9 enters the inside of the third lens body 12 from the incidence surface 12*a* via the air layer K, and is emitted to the outside of the third lens body 12 from the emission surface 12*b*. Accordingly, the second light L22 forms a light distribution pattern below the light distribution pattern HP for a high beam shown in FIG. 15.

In addition, the second light L22 entering the second boundary surface T2 approaches a position or a beam angle of the first light L12 reflected at the second boundary surface T2 when passing through the second boundary surface T2. Accordingly, since the second light L22 is emitted below the cutoff line CL of the light distribution pattern LP for a low beam, it is possible to overlap a lower portion of the light distribution pattern HP for a high beam and the cutoff line CL of the light distribution pattern LP for a low beam shown in FIG. 15.

In addition, in the vehicle lamp 1B of the embodiment, some of the first light L1 emitted from the above mentioned first light source 2 enters the inside of the second lens body 11 from the third incidence part 13. Here, the first light L13 entering the inside of the second lens body 11 from the third incidence part 13 is guided toward the front of the second lens body 11 while being diffused toward the vicinity of the boundary line S in the vertical cross section of the vehicle lamp 1A shown in FIG. 9.

Among these, the first light L13 entering the first boundary surface T1 passes through the first boundary surface T1 and enters the inside of the first lens body 9, and then, is guided toward the emission part 8 and is emitted to the outside of the first lens body 9 from the emission part 8. Further, the first light L13 emitted to the outside of the first lens body 9 enters the inside of the third lens body 12 from the incidence surface 12*a* via the air layer K and is emitted to the outside of the third lens body 12 from the emission surface 12*b*. Accordingly, the first light L13 forms a light distribution pattern for overhead (third light distribution pattern) OP to irradiate a traffic sign or the like above the cutoff line CL in the light distribution pattern LP for a low beam shown in FIG. 15.

As described above, in the vehicle lamp 1B of the embodiment, it is possible to obtain the good light distribution pattern HP for a high beam, the light distribution pattern LP for a low beam and the light distribution pattern OP for overhead required for the light distribution pattern LP for a low beam, by projecting the first light L1 and the second light L2 emitted from the first light source 2 and the second light source 3 using the projection lens 4.

In addition, in the vehicle lamp 1B of the embodiment, the first lens body 9 and the second lens body 11 that constitute the above mentioned projection lens 4 are coupled via the intermediate layer M without having an air layer present between the first boundary surfaces T1 and the second boundary surfaces T2 by causing the respective the first boundary surface T1 and the respective second boundary surface T2 to abut against each other via the intermediate layer M.

Accordingly, in the vehicle lamp 1B of the embodiment, it is possible to prevent occurrence of Fresnel loss at between the first boundary surfaces T1 and between the second boundary surfaces T2, and it is possible to increase utilization efficiency of the first light L1 and the second light L2 emitted from the first light source 2 and the second light source 3.

Further, in the vehicle lamp 1B of the embodiment, it is possible to achieve reduction in the entire thickness by minimizing a height dimension of the projection lens 4.

In the vehicle lamp 1B of the embodiment, it is possible to share a function of condensing the first light L1 and the second light L2 in the vertical direction of the vehicle lamp 1B and a function of condensing the first light L1 and the second light L2 in the horizontal direction of the vehicle lamp 1B between the emission part 8 of the first lens body 9 and the third lens body 12 by adding the third lens body 12.

Third Embodiment

Next, for example, a vehicle lamp 1C shown in FIG. 13 and FIG. 14 will be described as a third embodiment of the present invention.

Figure 13:
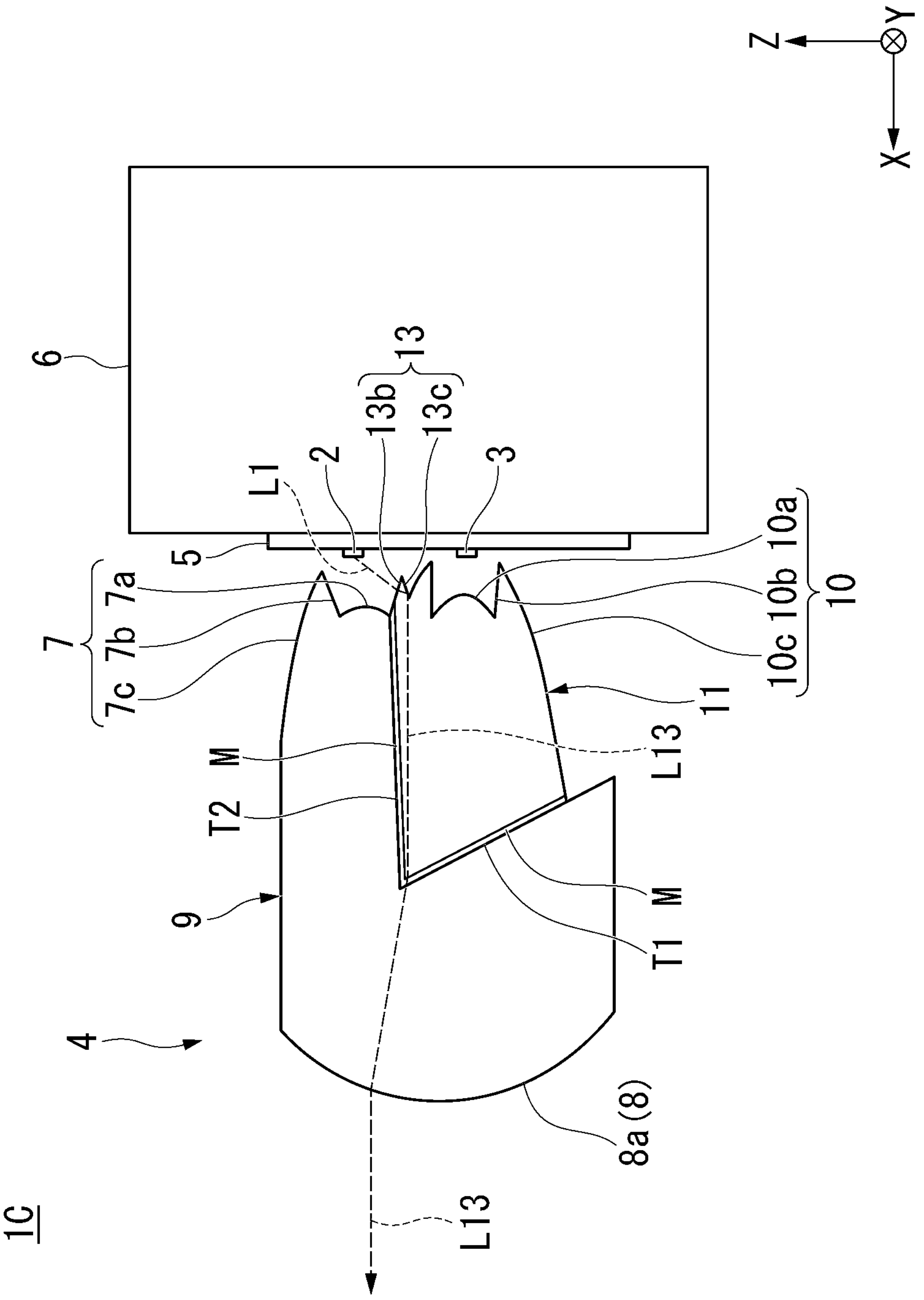
FIG. 13 is a vertical cross-sectional view showing a configuration of a vehicle lamp according to a third embodiment of the present invention.

Further, FIG. 13 is a vertical cross-sectional view showing a configuration of the vehicle lamp 1C. FIG. 14 is a horizontal cross-sectional view showing a configuration of the vehicle lamp 1C. In addition, in the following description, in the same areas as the vehicle lamp 1A, description thereof will be omitted, and the same reference signs in the drawings are designated to the areas.

As shown in FIG. 13, the vehicle lamp 1C of the embodiment has a configuration in which the refractive index of the second lens body 11 is greater than the refractive index of the first lens body 9, in the configuration of the above mentioned vehicle lamp 1A. Accordingly, in the embodiment, for example, the second lens body 11 is formed of a poly carbonate resin (PC), and the first lens body 9 is formed of an acryl resin (PMMA).

The third incidence part 13 has a diffusion incidence surface 13*b* having a concave surface shape located above a portion protruding from above the condensing reflection surface 10*c* and into which some of the first light L1 emitted from the first light source 2 enters, and a diffusion reflection surface 13*c* having a concave surface shape located below the protruded portion and configured to reflect the first light L13 entering from the diffusion incidence surface 13*b*.

In the third incidence part 13, among the first light L1 radially emitted from the first light source 2, the first light L13 entering the inside of the second lens body 11 from the diffusion incidence surface 13*b* located below the portion facing the first light source 2 is refracted toward the diffusion reflection surface 13*c*, and then, is reflected forward by the diffusion reflection surface 13*c*.

Accordingly, the first light L13 entering the inside of the second lens body 11 from the third incidence part 13 is guided toward the front of the second lens body 11 while being diffused toward the vicinity of the boundary line S in the vertical cross section of the vehicle lamp 1C shown in FIG. 13.

Figure 14:
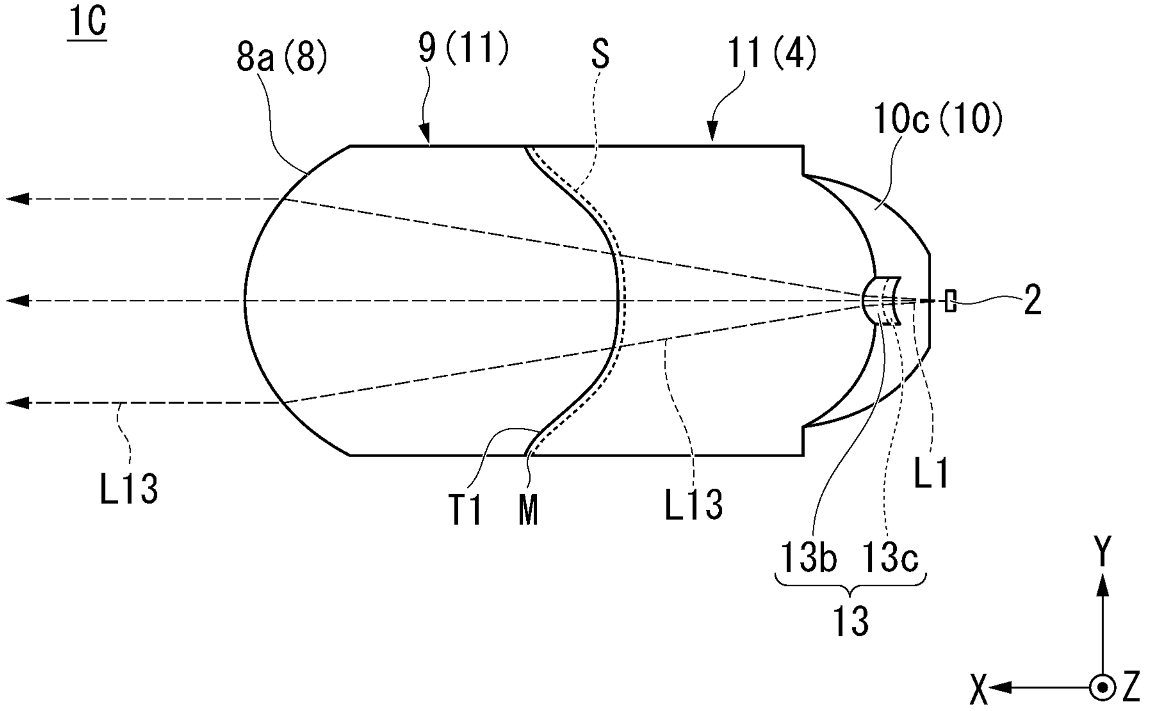
FIG. 14 is a horizontal cross-sectional view showing a configuration of the vehicle lamp shown in FIG. 13 on the side of a third incidence part.

Meanwhile, the first light L13 entering the inside of the second lens body 11 from the third incidence part 13 is diffused and guided toward the front of the second lens body 11 in the horizontal cross section of the vehicle lamp 1C shown in FIG. 14.

In addition, the first light L13 entering the inside of the second lens body 11 from the third incidence part 13 passes through the first boundary surface T1 in front of the second lens body 11 and enters the inside of the first lens body 9. The first light L13 entering the inside of the first lens body 9 is guided toward the emission part 8 and emitted to the outside of the first lens body 9 from the emission part 8.

Figure 15:
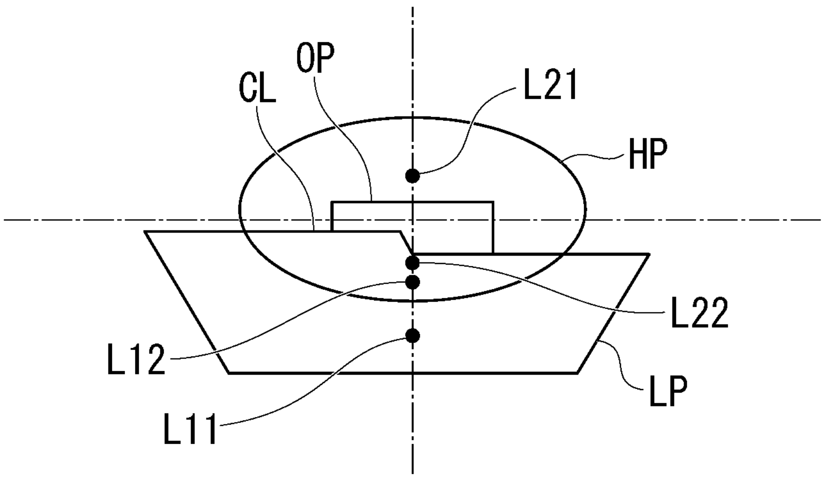
FIG. 15 is a schematic view showing a light distribution pattern for a low beam, a light distribution pattern for a high beam, and a light distribution pattern for overhead formed by first light and second light.

Accordingly, the first light L13 forms a light distribution pattern OP for overhead (third light distribution pattern) to irradiate a traffic sign or the like above the cutoff line CL in the light distribution pattern LP for a low beam shown in FIG. 15.

As described above, in the vehicle lamp 1C of the embodiment, like the vehicle lamp 1A, it is possible to obtain the good light distribution pattern LP for a low beam, the light distribution pattern HP for a high beam and the light distribution pattern OP for overhead required for the light distribution pattern LP for a low beam, by projecting the first light L1 and the second light L2 emitted from the first light source 2 and the second light source 3 using the projection lens 4.

Further, the configuration of the vehicle lamp 1C is not limited to the case applied to the configuration of the vehicle lamp 1A and may be applied to the configuration of the vehicle lamp 1B.

Further, the present invention is not necessarily limited to the embodiment, and various modifications may be made without departing from the scope of the present invention.

For example, in the vehicle lamp 1A, 1B or 1C, while the configuration in which the first lens body 9 and the second lens body 11 abut each other via the intermediate layer M is provided, a configuration in which the intermediate layer M is omitted and the first lens body 9 and the second lens body 11 directly abut each other may be provided.

Further, while the vehicle lamp to which the present invention is applied is appropriately used for the above-mentioned headlight (headlamp) for a vehicle, the vehicle lamp to which the present invention is applied is not limited to the vehicle lamp on the front side and, for example, the present invention can also be applied to a vehicle lamp on a rear side such as a rear combination lamp or the like.

That is, the present invention may be widely applied to a vehicle lamp including a first light source configured to emit first light, a second light source disposed adjacent to the first light source and configured to emit second light in the same direction as the first light, and a projection lens project the first light and the second light in the same direction.

In addition, the first light source and the second light source are not limited to the above-mentioned LEDs, and for example, may use a light emitting element such as a laser diode (LD) or the like. In addition, color of the first light and the second light is also not limited to the above-mentioned white light, and may be appropriately changed according to a purpose thereof, for example, red light, orange light, or the like. Further, the first light source and the second light source may be configured to selectively emit first light and second light of different colors.

In addition, while the direction in which the first light source 2 and the second light source 3 are arranged is the vertical direction of the vehicle lamp 1A, 1B or 1C and the direction in which the boundary line S extends is the horizontal direction of the vehicle lamp 1A, 1B or 1C in the vehicle lamp 1A, 1B or 1C, the present invention may be applied to a vehicle lamp in which a direction in which a first light source and a second light source are arranged is a horizontal direction of the vehicle lamp and a direction in which a boundary line extends is a vertical direction of the vehicle lamp.

REFERENCE SIGNS LIST

1A, 1B, 1C . . . vehicle lamp 2 . . . first light source 3 . . . second light source 4 . . . projection lens 5 . . . circuit board 6 . . . heat sink 7 . . . first incidence part 8 . . . emission part 9 . . . first lens body 10 . . . second incidence part 11 . . . second lens body 12 . . . third lens body 13 . . . third incidence part T1 . . . first boundary surface T2 . . . second boundary surface M . . . intermediate layer S . . . boundary line L1 . . . first light L2 . . . second light LP . . . light distribution pattern for low beam HP . . . light distribution pattern for high beam OP . . . light distribution pattern for overhead

The invention claimed is:

1. A vehicle lamp comprising:

a first light source configured to emit first light;

a second light source that is disposed adjacent to the first light source and that is configured to emit second light in a same direction as the first light; and a projection lens configured to project the first light and the second light in the same direction, wherein the projection lens has a first lens body including a first incidence part located in an area facing the first light source and an emission part located on a side opposite to the first incidence part, and a second lens body including a second incidence part located in an area facing the second light source and a third incidence part between the first incidence part and the second incidence part, and a structure in which the first lens body and the second lens body abut against each other in a state in which first boundary surfaces and second boundary surfaces are interposed between the first lens body and the second lens body, the first boundary surfaces being provided between the first lens body and the second lens body at between the emission part and the third incidence part, and second boundary surfaces being provided between the first lens body and the second lens body and extending from a boundary line with respect to the first boundary surface until the first incidence part and the third incidence part, the first boundary surfaces and the second boundary surfaces are disposed at an acute angle while having the boundary line disposed therebetween, among first light entering an inside of the first lens body from the first incidence part, first light reflected at the second boundary surface is emitted to outside of the first lens body from the emission part, among second light entering an inside of the second lens body from the second incidence part, second light passing through the first boundary surface and second light passing through the second boundary surface are emitted to the outside of the first lens body from the emission part, and among first light entering the inside of the second lens body from the third incidence part, first light passing through the first boundary surface is emitted to the outside of the first lens body from the emission part.

2. The vehicle lamp according to claim 1, wherein a refractive index of the second lens body is smaller than a refractive index of the first lens body.

3. The vehicle lamp according to claim 2, wherein a structure in which the first lens body and the second lens body abut each other via an intermediate layer is provided, and the refractive index of the second lens body is equal to or smaller than a refractive index of the intermediate layer.

4. The vehicle lamp according to claim 1, wherein the emission part has a lens surface configured to condense the first light and the second light in a direction in which the boundary line extends and a direction in which the first light source and the second light source are arranged.

5. The vehicle lamp according to claim 1, wherein the projection lens has a third lens body located on a side facing the emission part, the emission part has a lens surface configured to condense the first light and the second light in a direction in which the boundary line extends, and the third lens body has a lens surface configured to condense the first light and the second light emitted from the emission part in a direction in which the first light source and the second light source are arranged.

6. The vehicle lamp according to claim 5, wherein the third lens body is integrally assembled to the first lens body in a state in which an air layer is provided between the third lens body and the emission part.

7. The vehicle lamp according to claim 1, wherein the first light source and the second light source are provided on a same surface of a same board.

8. The vehicle lamp according to claim 1, wherein the first light entering from the first incidence part and projected by the projection lens forms a first light distribution pattern including a cutoff line defined by the boundary line on an upper end thereof, the second light entering from the second incidence part and projected by the projection lens forms a second light distribution pattern located above the first light distribution pattern, and the first light entering from the third incidence part and projected by the projection lens forms a third light distribution pattern located above the cutoff line.

* * * * *